US012591340B2

(12) United States Patent
    Do

(10) Patent No.: US 12,591,340 B2
(45) Date of Patent: Mar. 31, 2026

(54) MICRO-LED TOUCH DISPLAY DEVICE

(71) Applicant: LG Display Co., Ltd., Seoul (KR)

(72) Inventor: Wonchang Do, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/803,135

(22) Filed: Aug. 13, 2024

(65) Prior Publication Data

US 2025/0271970 A1 Aug. 28, 2025

(30) Foreign Application Priority Data

Feb. 22, 2024 (KR) ........................ 10-2024-0025597

(51) Int. Cl.
    G06F 3/044 (2006.01)
    G09G 3/32 (2016.01)
(52) U.S. Cl.
    CPC ............... G06F 3/044 (2013.01); G09G 3/32 (2013.01)
(58) Field of Classification Search
    CPC .................................. G06F 3/044; G09G 3/32
    See application file for complete search history.

(56) References Cited

U.S. PATENT DOCUMENTS

| 11,073,927 B2 * | 7/2021 | Sauer | ................... G06F 3/04166 |
| 2020/0033979 A1 * | 1/2020 | Sauer | ...................... G06F 3/044 |
| 2024/0103669 A1 * | 3/2024 | Paul | ........................ G06F 3/044 |

FOREIGN PATENT DOCUMENTS

KR          102435271 B1    8/2022

* cited by examiner

*Primary Examiner* — Peter D Mcloone
(74) *Attorney, Agent, or Firm* — Seed Intellectual Property Law Group LLP

(57) ABSTRACT

Disclosed is a micro-LED touch display device in which an optimized partial sensing scheme is applied to a less-touch-sensitive area where an area size of a touch sensing block is small. The micro-LED touch display device includes a display panel including a plurality of pixels, each including a micro-LED, and a micro-driver that controls an operation of the plurality of pixels, wherein a display area of the display panel is divided into a plurality of touch pixel blocks, wherein each analog front end circuit is disposed in each of the plurality of touch pixel blocks and is configured to drive each of the plurality of touch pixel blocks, based on an individual touch driving signal.

17 Claims, 5 Drawing Sheets

CH1          CH2      ⋯      CH5          CH6

CH1          CH2      ⋯          CH6

MICRO-LED TOUCH DISPLAY DEVICE

CROSS-REFERENCE TO RELATED APPLICATION

This application claims priority from Korean Patent Application No. 10-2024-0025597 filed on Feb. 22, 2024 in the Korean Intellectual Property Office, and all the benefits accruing therefrom under 35 U.S.C. 119, the contents of which in its entirety are herein incorporated by reference.

BACKGROUND

Technical Field

The present disclosure relates to a micro-LED touch display device.

Description of the Related Art

As modern society gradually develops into an information society, the demand for home appliances and various portable electronic devices increases. In this trend, the demand for various lightweight and thin display devices is increasing.

The display device is implemented in various forms such as a LCD (Liquid Crystal Display) device, an organic light-emitting display device (OLED), and a micro-LED (light-emitting diode) touch display device.

Each of the organic light-emitting display device and the micro-LED display device includes a self-light-emitting element and thus does not require a separate light source such as a backlight used in the liquid crystal display device, and thus may be made to be thinner or may be used as a display device in various forms.

BRIEF SUMMARY

The micro-LED has very high internal quantum efficiency, and thus displays an image at a high luminance level while consuming low power. For this reason, the development of the micro-LED display device has been actively underway recently.

A touch structure of the micro-LED display device is different from a conventional scheme of attaching a touch panel in a form of a film onto a display panel. In the touch structure of the micro-LED display device, a pattern structure may be applied using a cathode electrode present as a top layer of the micro-LED display panel and may act as a touch sensor.

The present disclosure is directed to a micro-LED display that is capable of differentiating only an operation frequency of a specific region in a time-division touch driving manner.

The techniques include beneficial effects. For example, when applying a micro-LED display panel to an electronic device such as a watch, an area size of an edge or a specific touch sensing block may be smaller than an area size of each of other touch sensing blocks depending on a panel design of the watch. The techniques help to prevent touch performance from deteriorating at an area where the touch sensing block has a small area size.

The present disclosure provides a micro-LED touch display device in which an optimized partial sensing scheme is applied to the area where the area size of the touch sensing block is small.

Furthermore, a purpose of the present disclosure is to provide a micro-LED touch display device in which the partial sensing scheme is applied to each touch sensing block to reduce noise and improve sensitivity, and thus to secure touch performance (signal-to-noise ratio) such that uniform touch performance across all areas of the display panel may be achieved.

Technical features and benefits of the present disclosure are not limited to the those above-mentioned. Other technical features and benefits according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

One embodiment of the present disclosure provides a micro-LED touch display device comprising: a display panel including: a plurality of pixels, each including a micro-LED; and a micro-driver for controlling an operation of the plurality of pixels, wherein a display area of the display panel is divided into a plurality of touch pixel blocks, wherein each analog front end circuit is disposed in each of the plurality of touch pixel blocks and is configured to drive each of the plurality of touch pixel blocks, based on an individual touch driving signal.

Another embodiment of the present disclosure provides a micro-LED touch display device comprising: a display panel including: a plurality of pixels, each including a micro-LED; and a micro-driver for controlling an operation of the plurality of pixels, wherein the display panel further includes: a first touch pixel block including a predetermined number of pixels; a second touch pixel block including a first number of a pixels, wherein the first number is smaller than the predetermined number; a first analog front-end circuit configured to apply a first touch driving signal to the first touch pixel block; and a second analog front end circuit configured to apply a second touch driving signal to the second touch pixel block, wherein at least one of a frequency and a number of pulses of the second touch driving signal is different from at least one of a frequency and a number of pulses of the first touch driving signal.

Still another embodiment of the present disclosure provides a micro-LED touch display device comprising: a display panel including a plurality of pixels, each including a micro-LED, wherein a display area of the display panel is divided into a plurality of touch pixel blocks for touch sensing, wherein the display panel operates in a time-division manner such that a display period for displaying an image and a touch period for sensing touch are temporally separated from each other, wherein during the touch period, each of the plurality of touch pixel blocks uses cathode electrodes of the corresponding micro-LEDs as electrodes for touch sensing, wherein each of the plurality of touch pixel blocks includes each of a plurality of analog front-end circuits configured to sense change in capacitance of the cathode electrodes in each of the plurality of touch pixel blocks.

According to embodiments of the present disclosure, each analog front end circuit is disposed in each of the plurality of touch pixel blocks and is configured to drive each of the plurality of touch pixel blocks, based on an individual touch driving signal. An optimized partial sensing scheme may be applied to a less-touch-sensitive areas where the touch sensing block area size is small.

Furthermore, the partial sensing scheme may be applied to each touch sensing block, thereby reducing noise and improving touch sensitivity. Thus, the touch performance may be secured and thus uniform touch performance across all areas of the display panel may be achieved.

Furthermore, power consumption may be reduced under low-power operation of the micro-LED.

Effects of the present disclosure are not limited to the effects mentioned above, and other effects not mentioned will be clearly understood by those skilled in the art from the description as set forth below.

In addition to the above effects, specific effects of the present disclosure are described together while describing specific details for carrying out the present disclosure.

DETAILED DESCRIPTIONS

Figure 1:
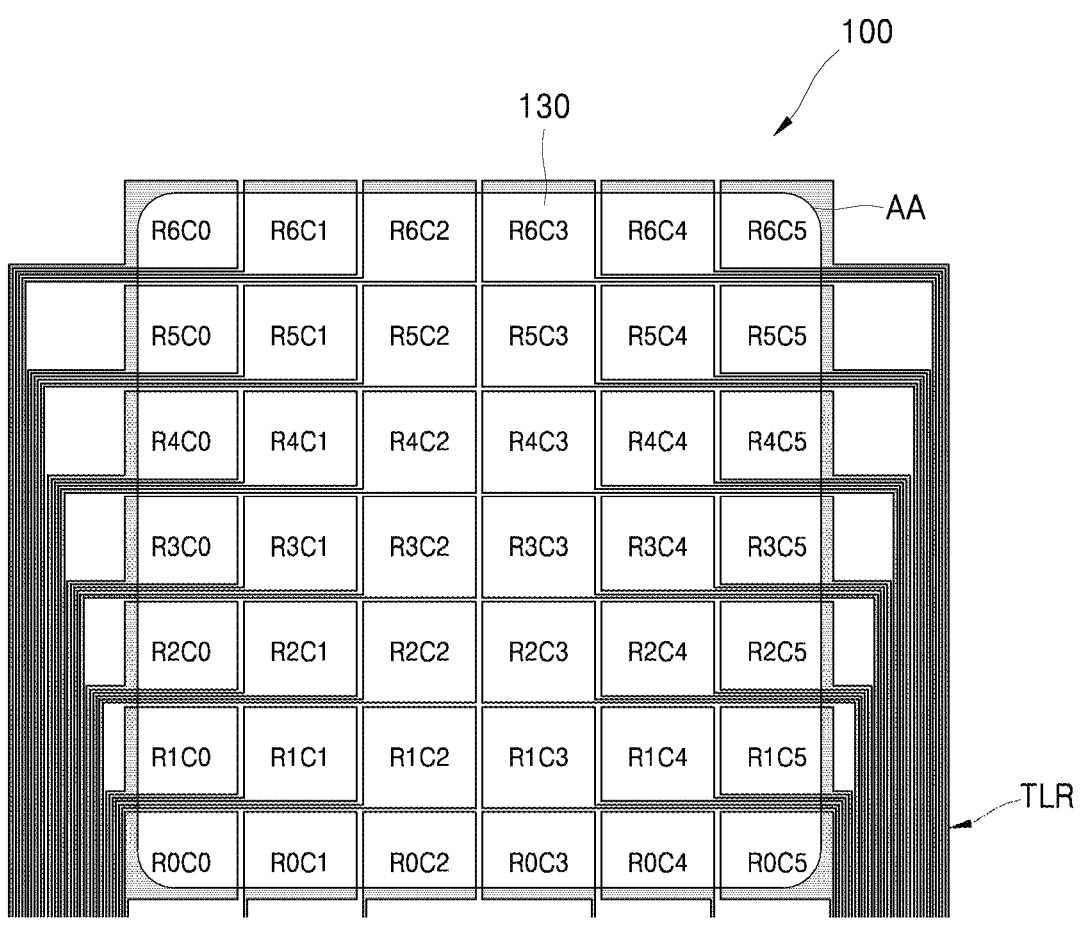
FIG. 1 is a schematic block diagram of a micro-LED touch display device according to an embodiment of the present disclosure.
Figure 1:
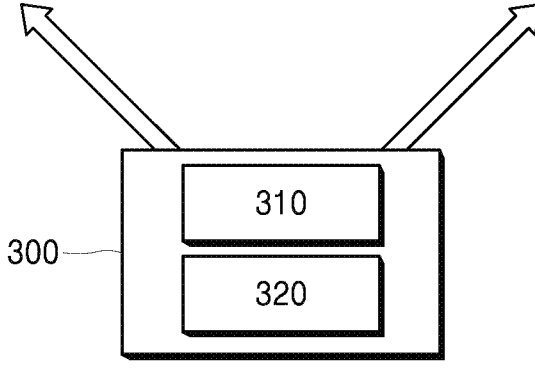

Technical characteristics and features of the present disclosure, and a method of achieving the technical characteristics and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, nents, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure and the appended claims.

A shape, a size, a ratio, an angle, a number, etc., disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise," "comprising," "include," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to," or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after," "subsequent to," "before," etc., another event may occur therebetween unless "directly after," "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first," "second," "third," and so on may be used herein to describe various elements, components, regions, layers and/or periods, these elements, components, regions, layers and/or periods should not be limited by these terms. These terms are used to distinguish one element, component, region, layer or section from another element, component, region, layer or period. Thus, a first element, component, region, layer or section as described under could be termed a second element, component, region, layer or period, without departing from the spirit and scope of the present disclosure.

When an embodiment may be implemented differently, functions or operations specified within a specific block may be performed in a different order from an order specified in a flowchart. For example, two consecutive blocks may actually be performed substantially simultaneously, or the blocks may be performed in a reverse order depending on related functions or operations.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to," or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or.' That is, unless otherwise stated or clear from the context, the expression that 'x uses a or b' means any one of natural inclusive permutations.

The terms used in the description as set forth below have been selected as being general and universal in the related technical field. However, there may be other terms than the terms depending on the development and/or change of technology, convention, preference of technicians, etc. Therefore, the terms used in the description as set forth below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description period. Therefore, the terms used in the description as set forth below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Throughout the present disclosure, "A and/or B" means A, B, or A and B, unless otherwise specified, and "C to D" means C inclusive to D inclusive unless otherwise specified.

"At least one" should be understood to include any combination of one or more of listed components. For example, at least one of first, second, and third components means not only a first, second, or third component, but also all combinations of two or more of the first, second, and third components.

Hereinafter, a micro-LED touch display device according to some embodiments will be described.

FIG. 1 is a schematic block diagram of a micro-LED touch display device according to an embodiment of the present disclosure.

The micro-LED touch display device according to one embodiment includes a display panel 100 and a touch driving circuit 300.

The display panel 100 includes a display area AA where an image is displayed, and this display area AA may be divided into a plurality of touch sensing blocks 130. Each of the plurality of touch sensing blocks 130 includes a plurality of touch pixel blocks 132 (see FIG. 3), each touch pixel block 132 being composed of a plurality of pixels. Each of the plurality of pixels includes a micro-LED.

The micro-LED may refer to an LED with a side size of 100 μm or smaller. This size is about $\frac{1}{10}$ or smaller of a size of a conventional LED. The micro-LED is known to have energy efficiency higher by about 20% than that of a conventional LED, and generates less heat amount and consumes less power amount due to a small size thereof.

The display panel 100 may operate in a time-division driving scheme in which a display period for displaying an image and a touch period for detecting touch are separated from each other to avoid noise that interferes with a normal operation of the touch. The display panel 100 may use a cathode electrode itself as a touch electrode without a separate layer that acts as a touch electrode.

For example, in the display panel 100, the cathode electrode of the micro-LED may be patterned in a grid manner and are divided into portions in an island form to form the plurality of touch sensing blocks 130. The touch sensing blocks 130 may be used as touch electrodes that sense change in a capacitance due to the touch thereon.

In one example, the display panel 100 may be divided into touch sensing blocks R0C0 to R0C5 in a first row to touch sensing blocks R6C0 to R6C5 in a seventh row. Each of the touch sensing blocks R0C0 to R0C5 in the first row to the touch sensing blocks R6C0 to R6C5 in the seventh row may be electrically connected to the touch driving circuit 300 via a touch line route TLR.

Furthermore, the display panel 100 may include a micro-driver 120 (see FIG. 4 and FIG. 5) that controls the operation of multiple pixels. The micro-driver 120 may drive a predetermined number of pixels. Each micro-driver 120 may be disposed in each of multiple areas of the display panel 100.

The touch driving circuit 300 applies a touch driving signal to the first row of the touch sensing blocks R0C0 to R0C5 to the seventh row of the touch sensing blocks R6C0 to R6C5 and may detect a touch signal may be detected from the first row of the touch sensing blocks R0C0 to R0C5 to the seventh row of the touch sensing blocks R6C0 to R6C5.

The touch driving circuit 300 may include an analog front-end circuit 310 and an analog-to-digital converter circuit 320.

The analog front-end circuit 310 may apply a touch driving signal with a predetermined period and amplitude to each of the touch sensing blocks R0C0 to R0C5 in the first row to the touch sensing blocks R6C0 to R6C5 in the seventh row. Furthermore, the analog front-end circuit 310 may sense the touch signal from the touch sensing blocks R0C0 to ROC5 in the first row to the touch sensing blocks R6C0 to R6C5 in the seventh row.

Furthermore, the analog front-end circuit 310 may perform various necessary pre-processing operations before converting an analog signal to a digital signal. The pre-processing operations may include, for example, filtering, amplification, and sampling. Only when this pre-processing is done well, digital processing be performed more accurately and efficiently. This analog front-end circuit 310 enables accurate touch recognition even on screens of more diverse shapes and sizes.

The analog-to-digital converter circuit 320 may receive a sensing voltage pre-processed by the analog front-end circuit 310, and may convert the sensing voltage into touch data as a digital signal. This touch data may be used to determine touch presence or absence and touch coordinates.

In one example, although not shown, the micro-LED touch display device may include a power management circuit and a timing controller.

The power management circuit may generate voltages necessary for driving the pixels and provide the generated voltages to the micro-driver 120 and at least one of the plurality of pixels 110 of the display panel 100. In one example, the power management circuit may generate power voltage, gate driving voltage, negative voltage, bias voltage, etc., which may in turn may be applied from the power management circuit to each micro-driver through individual power lines, respectively. The negative voltage and the bias voltage may be applied to the cathode electrode of the micro-LED during the display period, and may be used to selectively drive one of multiple micro-LEDs.

The timing controller may receive image data from a host system and may receive timing signals such as a vertical synchronization signal, a horizontal synchronization signal, a data enable signal, and a main clock from the hos system. The timing controller may convert the image data into a format suitable for a size and resolution of the display panel and provide the image data having the converted format to the micro-driver 120 and the touch driving circuit 300. The vertical synchronization signal may allow the display device to operate in the time-division driving manner such that the display period and the touch period are temporally separated from each other.

Figure 2:
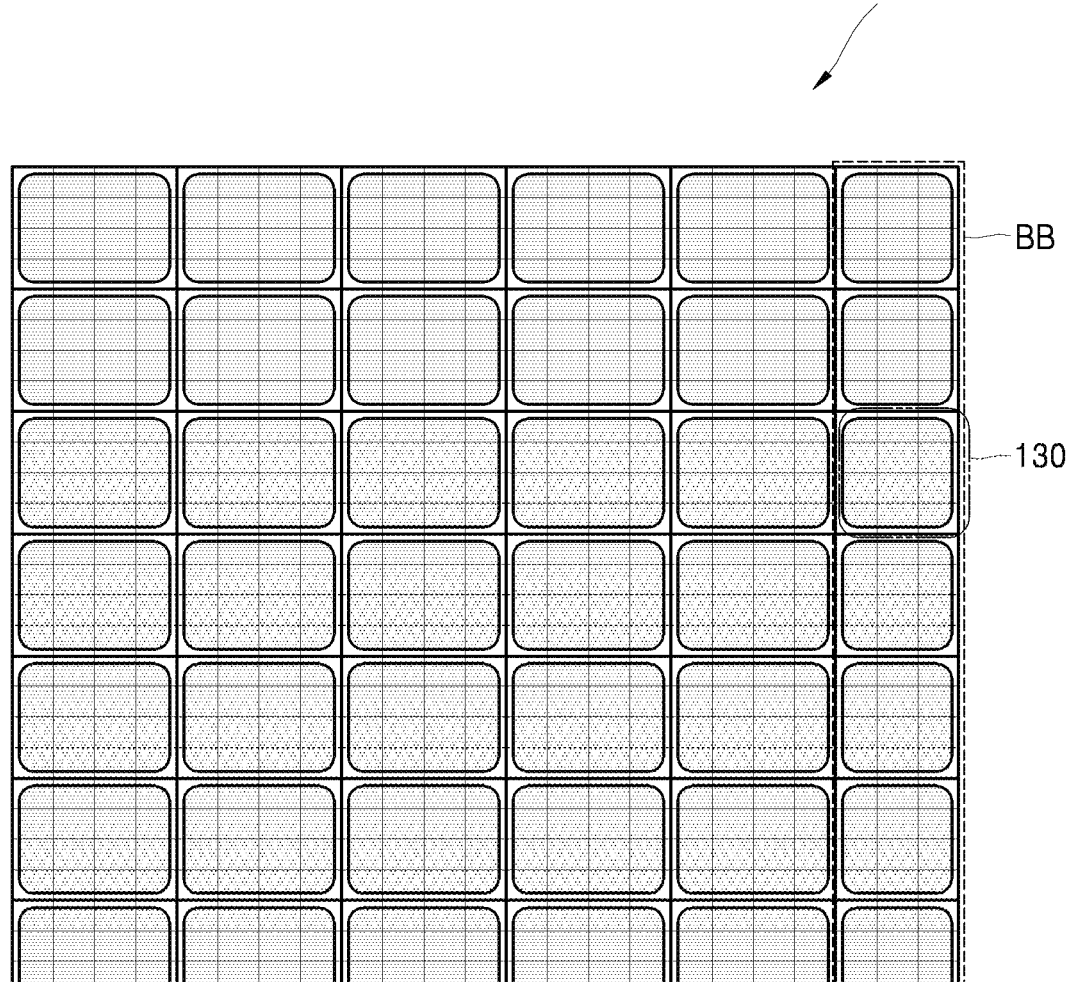
FIG. 2 is a schematic plan view of a micro-LED touch display panel according to an embodiment of the present disclosure.
Figure 3:
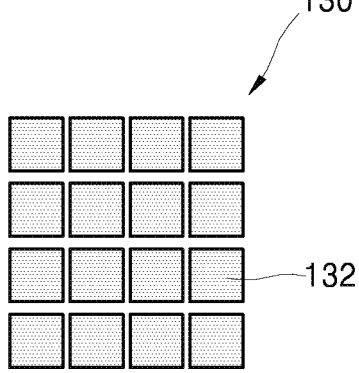
FIG. 3 shows one touch sensing block including multiple touch pixel blocks according to an embodiment of the present disclosure.

FIG. 2 is a schematic plan view of a micro-LED touch display panel according to an embodiment of the present disclosure. FIG. 3 shows one touch sensing block 130 including a plurality of touch pixel blocks 132 according to an embodiment of the present disclosure.

Depending on a type of an electronic device to which the display panel 100 is applied, an area size of a specific touch sensing block among the touch sensing blocks 130 of the display panel 100 may be smaller than an area size of each of other touch sensing blocks among the touch sensing blocks 130 of the display panel 100. For example, the display panel 100 may be applied to wearable electronic devices, such as watches. In this case, depending on the various designs of the watch, the edge of the display panel may have a small number of pixels, such that touch sensing sensitivity may be lowered in the edge area.

In FIG. 2, a BB area illustrates a less-touch-sensitive area BB having a smaller number of pixels than that of each of other touch sensing blocks. As used herein, the less-touch-sensitive area BB may be defined as an area of touch sensing blocks where the touch sensitivity may be reduced because the number of pixels used for touch detection is smaller therein, compared to other touch sensing blocks.

However, in the micro-LED display device as shown in FIG. 1, one touch driving circuit 300 controls all touch sensing blocks of the display panel 100. Thus, it may be difficult to differentiate only an operation frequency of a specific area in a time-division touch driving. Furthermore, due to a difference between the design (or the number of sub-pixels) of areas of the display panel 100, the number of touch pixel blocks 132 that may be sensed in one edge area may be physically reduced, resulting in a difference between touch performances of the areas of the display panel.

Accordingly, in the micro-LED touch display device according to an embodiment of the present disclosure, a separate analog front-end circuit 310 is disposed in each touch pixel block 132 for touch sensing, such that the operation frequency of the specific area may be different from that of each of other areas.

In the micro-LED touch display device according to an embodiment of the present disclosure, a partial sensing scheme may be used to maximize the touch sensitivity of the edge area where the number of the touch pixel blocks 132 is smaller due to the design, thereby compensating for touch performance thereof.

The micro-LED touch display device according to an embodiment of the present disclosure includes each analog front-end circuit 310 in each touch pixel block 132. Thus, the touch driving signal having a different waveform from that of the touch driving signal applied to the other areas may be applied to the less-touch-sensitive area BB resulting from the design, such that expected decline in the touch performance of the area BB may be prevented in advance. In this regard, the touch performance may be expressed as a ratio (SNR=Touch sensitivity/Noise) of the touch sensitivity relative to noise.

Figure 4:
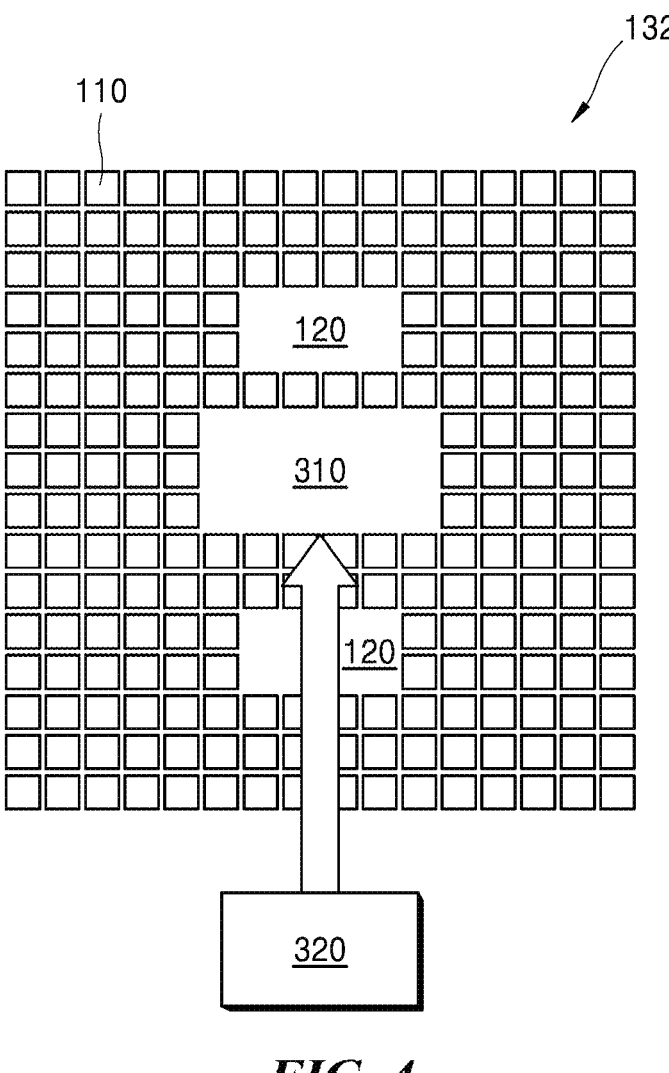
FIG. 4 shows the structure of a touch pixel block in FIG. 3.

FIG. 4 shows a structure of the touch pixel block 132 in FIG. 3.

Referring to FIG. 4, the touch pixel block 132 may include a plurality of pixels 110, each including a micro-LED, and at least one micro-driver 120 that controls the operation of the plurality of pixels 110.

FIG. 4 illustrates that two micro-drivers 120 are disposed in one touch pixel block 132. However, embodiments of the display device are not limited thereto. One micro-driver 120 may be disposed in one touch pixel block 132. Alternatively, one micro-driver 120 may be disposed in two touch pixel blocks 132 to control the operation of the micro-LEDs.

The touch pixel block 132 may include the analog front-end circuit 310 that applies the touch driving signal to the cathode electrode of the micro-LED. The analog front end circuit 310 may be disposed in a center area of the touch pixel block 132.

Each analog front-end circuit 310 may be provided in each of the plurality of touch pixel blocks 132, and may drive each of the plurality of touch pixel blocks 132 based on an individual touch driving signal. For example, the analog front-end circuit 310 may modify and apply at least one of a frequency and the number of pulses of the touch driving signal to at least one of the plurality of touch pixel blocks 132.

In one example, the analog front-end circuit 310 provided in the touch pixel block 132 of the less-touch-sensitive area BB where the number of pixels is smaller than a reference value among the plurality of pixel touch blocks 132 may increase at least one of the frequency and the number of pulses of the touch driving signal, compared to that of the touch driving signal applied to the touch pixel blocks of each of the other areas and may apply the touch driving signal having the increased at least one to the touch pixel block 132 of the less-touch-sensitive area BB.

For example, an example in which the display panel 100 includes a first touch pixel block including a predetermined number of pixels, and a second touch pixel block including a smaller number of pixels than that of the first touch pixel block will be described. A first analog front-end circuit provided in the first touch pixel block and a second analog front-end circuit provided in the second touch pixel block may individually (independently) apply different types of a first touch driving signal and a second touch driving signal to the first touch pixel block and the second touch pixel block, respectively.

In this regard, the second analog front-end circuit may be configured to increase at least one of the frequency and the number of pulses of the second touch driving signal to increase the touch sensitivity of the second touch pixel block of the less-touch-sensitive area BB, compared to that of the first touch driving signal of the first analog front-end circuit and to apply the second touch driving signa to the second touch pixel block.

In this way, each of the plurality of analog front-end circuits 310 provided in each of the plurality of touch pixel blocks 132 may independently apply the touch driving signal to the corresponding touch pixel block during the touch period, and may sense change in capacitance of the cathode electrode of the micro-LED in the corresponding touch pixel block.

For example, when an object such as a finger or a touch pen touches the display panel, an object capacitor may be generated between the object and the cathode electrode, and thus the analog front-end circuit may sense the change in capacitance of the object capacitor. In this regard, the object capacitor may be defined as a capacitor generated between the object and the cathode electrode when the object touches the display panel.

The analog front-end circuit 310 may pre-process the touch signal corresponding to the change in the capacitance and convert the pre-processed touch signal into a sensing voltage, and provide the sensing voltage to the analog-to-digital converter circuit 320 external thereto.

The analog front-end circuit 310 may include circuits that perform operations such as filtering, amplification, and sampling as pre-processing operations. An internal configuration of the analog front end circuit 310 may be known to the skilled person to the art.

The analog-to-digital converter circuit 320 may receive the sensing voltage from the analog front-end circuit 310, and may convert the sensing voltage into the touch data as a digital signal, and may determine touch presence or absence and calculate touch coordinates, based on the touch data.

Figure 5:
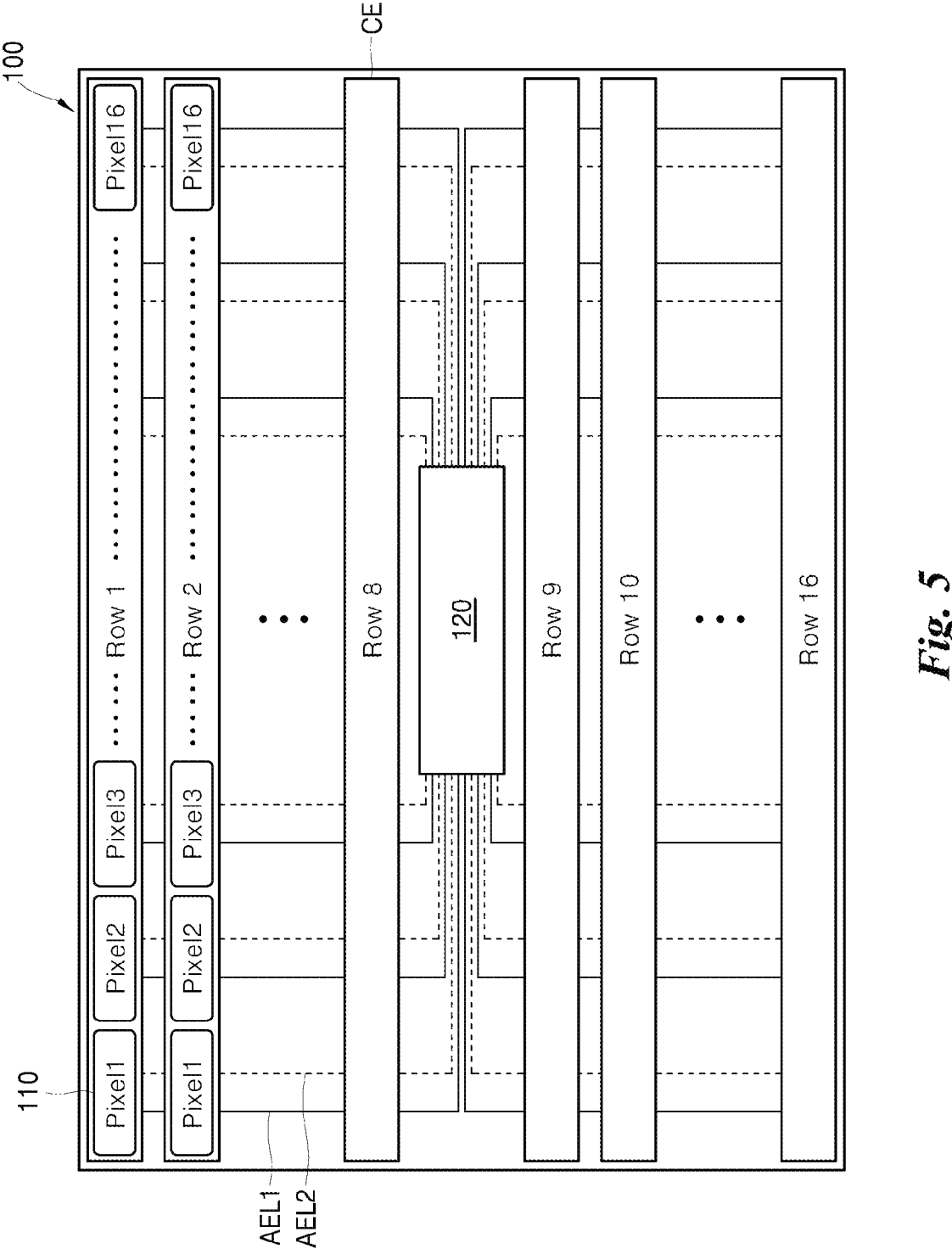
FIG. 5 is a plan view of a micro-LED display device according to an embodiment of the present disclosure.

FIG. 5 is a plan view of a micro-LED display device according to an embodiment of the present disclosure.

Referring to FIG. 5, the display panel 100 may include a first row cathode electrode Row1 to a sixteenth row cathode electrode Row16, the micro-driver 120, and the plurality of pixels 110.

The first row cathode electrode Row1 to the 16-th row cathode electrode Row16 may be embodied as the cathode electrodes CE of the micro-LEDs, and may extend in the X-axis direction of the display panel 100 and may be arranged so as to be spaced from each other by an equal spacing in the Y-axis direction. The plurality of pixels 110 may be arranged so as to be spaced from each other by an equal spacing in the X-axis direction in an area corresponding to each of the first row cathode electrode Row1 to the sixteenth row cathode electrode Row16. In one example, first to sixteenth pixel circuits may be arranged in an area corresponding to each of the first row cathode electrode Row1 to the sixteenth row cathode electrode Row16.

The micro-driver 120 may be disposed between the first row cathode electrode Row1 to the eighth row cathode electrode Row8 and the ninth row cathode electrode Row9 to the 16-th row cathode electrode Row16.

The micro-driver 120 may be connected to each of the plurality of pixels 110 via a first anode electrode line AEL1 and a second anode electrode line AEL2. The first anode electrode line AEL1 may be connected to an anode electrode of the micro-LED in each of the plurality of pixels 110. The second anode electrode line AEL2 may be connected to an anode electrode of a redundant redundancy micro-LED in each of the plurality of pixels 110.

For example, when each of first to eighth micro-LEDs connected to the micro-driver 120 via each of the first anode electrode lines AEL1 are disposed in each of the plurality of pixels 110, each of first to eighth redundant micro-LEDs connected to the micro-driver 120 via each of the second anode electrode lines AEL2 may be disposed in each of the plurality of pixels 110.

The redundant micro-LED may operate in an event of a non-redundant micro-LED failure. Although not shown in the drawing, in a pixel area of the display panel 100 where the pixel 110 is disposed, a gate line, a data line, and a thin-film transistor for driving the micro-LED may be formed, as well as a redundant gate line, a redundant data line, and a redundant thin-film transistor for driving the redundant micro-LED may be formed.

For example, the first micro-LED to the eighth micro-LED and the first redundant micro-LED to the eighth redundant micro-LED may operate separately under control of different thin-film transistors operating based on signals input thereto via different paths.

Figure 6:
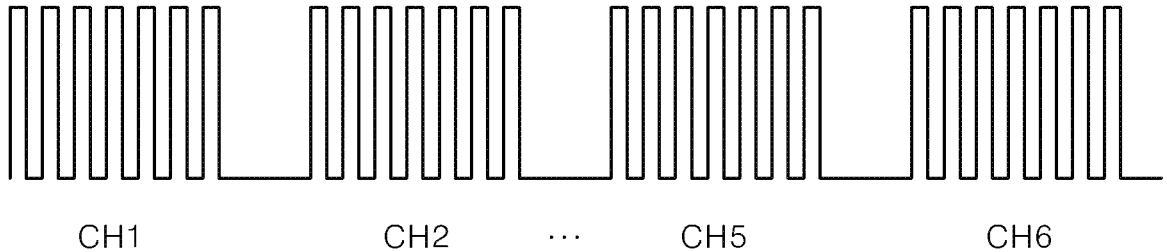
FIG. 6 illustrates that the same touch driving signal is applied to all of channels in a micro-LED touch display device according to an embodiment of the present disclosure.
Figure 7:
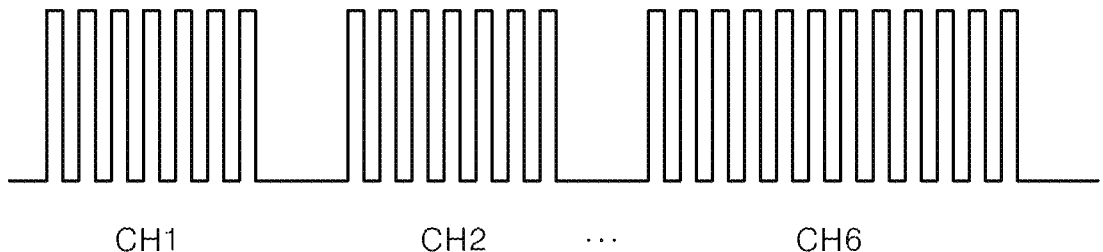
FIG. 7 illustrates that a different touch driving signal from a touch driving signal applied to channels other than a specific channel is applied to the specific channel in a micro-LED touch display device according to an embodiment of the present disclosure.

FIG. 6 illustrates that the same touch driving signal is applied to all of channels in a micro-LED touch display device according to an embodiment of the present disclosure. FIG. 7 illustrates that a different touch driving signal from a touch driving signal applied to channels other than a specific channel is applied to the specific channel in a micro-LED touch display device according to an embodiment of the present disclosure.

As shown in FIG. 6, the micro-LED touch display device may apply the same touch driving signal to each of all channels CH1 to CH6 via each analog front end circuit 310. In this regard, the channel may mean a touch line routing connecting the touch pixel block 132 and the analog front end circuit 310 to each other.

Furthermore, as shown in FIG. 7, the micro-LED touch display device may apply a different type of a touch driving signal from that applied to each of other channels CH1 and CH2 than a specific channel CH6 to the specific channel CH6.

In one example, an individual sensing scheme on a touch pixel block 132 basis is applied to the less-touch-sensitive area BB due to the design. For example, the touch driving signal in which at least one of the number of pulses and the frequency is modified may be applied to the channel corresponding to the less-touch-sensitive area BB, thereby contributing to improving of the touch performance. Increasing the number of pulses and the frequency may allow a magnitude of a sensed signal to be increased, compared to the noise.

A configuration in which one touch driving circuit 300 controls all touch pixel blocks 132 of the display panel has various limitations in terms of modification of the frequency or the pulse of the touch driving signal applied to the touch pixel block in a specific area. However, in the micro-LED touch display device according to an embodiment of the present disclosure, each analog front-end circuit 310 may correspond to each touch pixel block 132, such that separate partial touch sensing of the less-touch-sensitive area BB may be achieved reliably.

Figure 8:
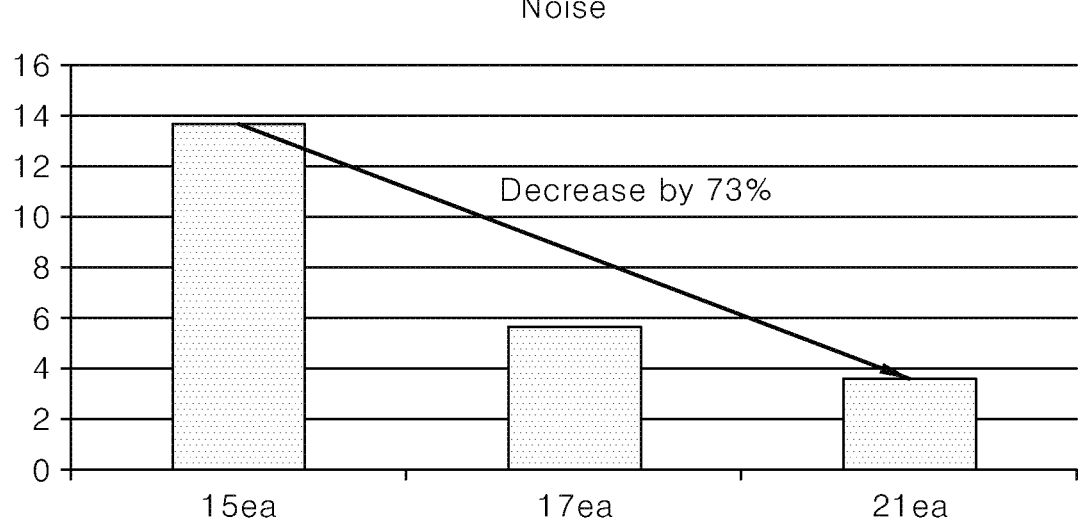
FIG. 8 shows improvement in touch performance resulting from individual operation of a touch pixel block according to another embodiment of the present disclosure.

FIG. 8 shows improvement in touch performance due to individual operation of the touch pixel block according to another embodiment of the present disclosure.

FIG. 8 shows an amount of noise change based on the number of pulses in the touch driving circuit. It may be identified based on FIG. 8 that when the number of pulses in the touch driving circuit increases from 15 ea, to 17 ea, and to 21 ea, the noise is reduced by 73%, thereby improving the touch performance.

According to embodiments of the present disclosure, each analog front end circuit is disposed in each of the plurality of touch pixel blocks and is configured to drive each of the plurality of touch pixel blocks, based on an individual touch driving signal. An optimized partial sensing scheme may be applied to a less-touch-sensitive areas where the touch sensing block area size is small.

Furthermore, the partial sensing scheme may be applied to each touch sensing block, thereby reducing noise and improving touch sensitivity. Thus, the touch performance may be secured and thus uniform touch performance across all areas of the display panel may be achieved.

Furthermore, power consumption may be reduced under low-power operation of the micro-LED.

A micro-LED touch display device according to some aspects and embodiments of the present disclosure may be described as follows:

A first aspect of the present disclosure provides a micro-LED touch display device comprising: a display panel including: a plurality of pixels, each including a micro-LED; and a micro-driver for controlling an operation of the plurality of pixels, wherein a display area of the display panel is divided into a plurality of touch pixel blocks, wherein each analog front end circuit is disposed in each of the plurality of touch pixel blocks and is configured to drive each of the plurality of touch pixel blocks, based on an individual touch driving signal.

In accordance with the micro-LED touch display device of the first aspect, the analog front-end circuit disposed in each of at least one of the plurality of touch pixel blocks is configured to: modify at least one of a frequency and a number of pulses of the touch driving signal; and apply the touch driving signal having the modified at least one to each of the at least one of the plurality of touch pixel blocks.

In accordance with the micro-LED touch display device of the first aspect, the analog front-end circuit disposed in a touch pixel block having a number of pixels smaller than a reference value among the plurality of touch pixel blocks is configured to: increase at least one of a frequency and a number of pulses of the touch driving signal to be larger than at least one of a frequency and a number of pulses the touch driving signal applied to each of the other touch pixel blocks; and apply the touch driving signal having the increased at least one to the touch pixel block having the number of pixels smaller than the reference value.

In accordance with the micro-LED touch display device of the first aspect, the micro-driver is configured to drive the display panel in a time-division manner such that a display period for displaying an image and a touch period for sensing touch are temporally separated from each other.

In accordance with the micro-LED touch display device of the first aspect, during the touch period, each analog front-end circuit is configured to apply the touch driving signal to cathode electrodes of the micro-LEDs of a corresponding touch pixel block.

In accordance with the micro-LED touch display device of the first aspect, during the touch period, each analog front-end is configured to apply the touch driving signal whose at least one of a frequency and a number of pulses has been modified to cathode electrodes of the micro-LEDs of a corresponding touch pixel block.

In accordance with the micro-LED touch display device of the first aspect, each analog front-end circuit is configured to sense a touch signal in response to the application of the touch driving signal and to convert the touch signal into a sensing voltage.

In accordance with the micro-LED touch display device of the first aspect, the micro-LED touch display device further comprises an analog-to-digital conversion circuit disposed outside the display panel and configured to receive the sensing voltage of the corresponding touch pixel block from the corresponding analog front-end circuit, and to convert the sensing voltage into touch data as a digital signal.

A second aspect of the present disclosure provides a micro-LED touch display device comprising: a display panel including: a plurality of pixels, each including a micro-LED; and a micro-driver for controlling an operation of the plurality of pixels, wherein the display panel further includes: a first touch pixel block including a predetermined number of pixels; a second touch pixel block including a first number of a pixels, wherein the first number is smaller than the predetermined number; a first analog front-end circuit configured to apply a first touch driving signal to the first touch pixel block; and a second analog front end circuit configured to apply a second touch driving signal to the second touch pixel block, wherein at least one of a frequency and a number of pulses of the second touch driving signal is different from at least one of a frequency and a number of pulses of the first touch driving signal.

In accordance with the micro-LED touch display device of the second aspect, the second analog front-end circuit is configured to: increase at least one of the frequency and the number of pulses of the second touch driving signal to be larger than at least one of the frequency and the number of pulses of the first touch driving signal; and apply the second touch driving signal having the increased at least one to the second touch pixel block.

In accordance with the micro-LED touch display device of the second aspect, the micro-driver is configured to drive the display panel in a time-division manner such that a display period for displaying an image and a touch period for sensing touch are temporally separated from each other.

In accordance with the micro-LED touch display device of the second aspect, during the touch period, the first analog front-end circuit and the second analog front-end circuit are configured to individually apply the first touch pixel block and the second touch driving signal to cathode electrodes of the micro-LEDs of the pixels of the first touch pixel block and cathode electrodes of the micro-LEDs of the pixels of the second touch pixel block, respectively.

In accordance with the micro-LED touch display device of the second aspect, the first analog front-end circuit and the second analog front-end circuit are configured to individually sense a first touch signal and a second touch signal, respectively, in response to the application of the first touch driving signal and the second touch driving signal.

In accordance with the micro-LED touch display device of the second aspect, the micro-LED touch display device further comprises an analog-to-digital conversion circuit disposed outside the display panel, wherein the analog-to-digital conversion circuit is configured to: receive each of a first sensing voltage of the first touch pixel block and a second sensing voltage of the second touch pixel block from each of the first analog front end circuit and the second analog front end circuit; and convert each of the first sensing voltage and the second sensing voltage to each of first touch data, and second touch data as a digital signal.

A third aspect of the present disclosure provides a micro-LED touch display device comprising: a display panel including a plurality of pixels, each including a micro-LED, wherein a display area of the display panel is divided into a plurality of touch pixel blocks for touch sensing, wherein the display panel operates in a time-division manner such that a display period for displaying an image and a touch period for sensing touch are temporally separated from each other, wherein during the touch period, each of the plurality of touch pixel blocks uses cathode electrodes of the corresponding micro-LEDs as electrodes for touch sensing, wherein each of the plurality of touch pixel blocks includes each of a plurality of analog front-end circuits configured to sense change in capacitance of the cathode electrodes in each of the plurality of touch pixel blocks.

In accordance with the micro-LED touch display device of the third aspect, each of the analog front-end circuits is disposed in each of the plurality of touch pixel blocks and is disposed in a center area of each touch pixel block.

In accordance with the micro-LED touch display device of the third aspect, at least one of the analog front-end circuits is configured to: modify at least one of a frequency and a number of pulses of a touch driving signal; and apply the touch driving signal having the modified at least one to the cathode electrodes of corresponding at least one of the plurality of touch pixel blocks.

In accordance with the micro-LED touch display device of the third aspect, the analog front-end circuit disposed in a touch pixel block having a number of pixels smaller than a reference value among the plurality of touch pixel blocks is configured to: increase at least one of a frequency and a number of pulses of the touch driving signal to be larger than at least one of a frequency and a number of pulses the touch driving signal applied to each of the other touch pixel blocks; and apply the touch driving signal having the increased at least one to the touch pixel block having the number of pixels smaller than the reference value.

In accordance with the micro-LED touch display device of the third aspect, when an object touches the display panel, an object capacitor is generated between the object and the cathode electrode, and the analog front-end circuit is configured to sense change in capacitance of the object capacitor.

In accordance with the micro-LED touch display device of the third aspect, the analog front-end circuit is configured to convert a touch signal corresponding to the change in capacitance into a sensing voltage, and provide the sensing voltage to an analog-to-digital converter circuit external thereto.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A micro-LED touch display device comprising:
   a display panel including:
      a plurality of pixels, each including a micro-LED;
      a micro-driver for controlling an operation of the plurality of pixels; and
      a plurality of analog front end circuits,
      wherein a display area of the display panel is divided into a plurality of touch pixel blocks,
      wherein a number of pixels included in each of the plurality of touch pixel blocks varies,
      wherein each analog front end circuit is disposed in each of the plurality of touch pixel blocks and is configured to drive corresponding one of the plurality of touch pixel blocks based on an individual touch driving signal, and
      wherein the analog front end circuit disposed in a touch pixel block having a number of pixels smaller than a reference value is configured to apply a touch driving signal including at least one of an increased frequency and an increased pulse count relative to that applied to another touch pixel block.

2. The micro-LED touch display device of claim 1, wherein the analog front-end circuit disposed in each of the plurality of touch pixel blocks is configured to:
   modify at least one of a frequency or a number of pulses of the touch driving signal; and
   apply the touch driving signal having the at least one of the frequency or the number of pulses modified to the corresponding one of the plurality of touch pixel blocks.

3. The micro-LED touch display device of claim 1, wherein the micro-driver is configured to drive the display panel in a time-division manner such that a display period for displaying an image and a touch period for sensing touch are temporally separated from each other.

4. The micro-LED touch display device of claim 3, wherein during the touch period, each analog front-end circuit is configured to apply the individual touch driving signal to cathode electrodes of the micro-LEDs of a corresponding touch pixel block.

5. The micro-LED touch display device of claim 3, wherein during the touch period, each analog front-end is configured to apply the individual touch driving signal with at least one of a frequency or a number of pulses modified to cathode electrodes of the micro-LEDs of a corresponding touch pixel block.

6. The micro-LED touch display device of claim 5, wherein each analog front-end circuit is configured to sense a touch signal in response to the application of the touch driving signal and to convert the touch signal into a sensing voltage.

7. The micro-LED touch display device of claim 6, wherein the micro-LED touch display device further comprises an analog-to-digital conversion circuit disposed outside the display panel and configured to receive the sensing voltage of a touch pixel block from the corresponding analog front-end circuit, and to convert the sensing voltage into touch data as a digital signal.

8. A micro-LED touch display device comprising:
a display panel including:
    a plurality of pixels, each including a micro-LED; and
    a micro-driver for controlling an operation of the plurality of pixels; and
    a plurality of analog front-end (AFE) circuits,
    wherein a display area of the display panel is divided into a plurality of touch pixel blocks, including:
    a first touch pixel block including a predetermined number of pixels;
    a second touch pixel block including a first number of a pixels, the first number is being smaller than the predetermined number,
    wherein each of the plurality of analog front-end circuits is disposed in and configured to individually drive a corresponding one of the plurality of touch pixel blocks based on a respective touch driving signal,
    wherein a first analog front-end circuit is disposed in the first touch pixel block and is configured to apply a first touch driving signal to the first touch pixel block,; and
    wherein a second analog front end circuit is disposed in the second touch pixel block and is configured to increase at least one of a frequency or a number of pulses of a second touch driving signal to be greater than a corresponding one of a frequency or a number of pulses of the first touch driving signal, and to apply the second touch driving signal having the at least one of the frequency or the number of pulses increased to the second touch pixel block having the first number of pixels smaller than the predetermined number.

9. The micro-LED touch display device of claim 8, wherein the micro-driver is configured to drive the display panel in a time-division manner such that a display period for displaying an image and a touch period for sensing touch are temporally separated from each other.

10. The micro-LED touch display device of claim 9, wherein during the touch period, the first analog front-end circuit and the second analog front-end circuit are configured to individually apply the first touch pixel block and the second touch driving signal to cathode electrodes of the micro-LEDs of the pixels of the first touch pixel block and cathode electrodes of the micro-LEDs of the pixels of the second touch pixel block, respectively.

11. The micro-LED touch display device of claim 10, wherein the first analog front-end circuit and the second analog front-end circuit are configured to individually sense a first touch signal and a second touch signal, respectively, in response to the application of the first touch driving signal and the second touch driving signal.

12. The micro-LED touch display device of claim 11, wherein the micro-LED touch display device further comprises an analog-to-digital conversion circuit disposed outside the display panel, wherein the analog-to-digital conversion circuit is configured to:
    receive each of a first sensing voltage of the first touch pixel block and a second sensing voltage of the second touch pixel block from each of the first analog front end circuit and the second analog front end circuit; and
    convert each of the first sensing voltage and the second sensing voltage to each of first touch data, and second touch data as a digital signal.

13. A micro-LED touch display device comprising:
a display panel including a plurality of pixels, each including a micro-LED,
wherein a display area of the display panel is divided into a plurality of touch pixel blocks for touch sensing, the plurality of touch pixel blocks respectively including different numbers of pixels including a touch pixel block having a number of pixels smaller than a reference value,
wherein the display panel is configured to operate in a time-division manner such that a display period for displaying an image and a touch period for sensing touch are temporally separated from each other,
wherein during the touch period, each of the plurality of touch pixel blocks uses cathode electrodes of the corresponding micro-LEDs as electrodes for touch sensing,
wherein each touch pixel block of the plurality of touch pixel blocks includes an analog front-end circuit disposed in and configured to individually drive the corresponding touch pixel block based on a respective touch driving signal
wherein the analog front-end circuit disposed in the touch pixel block having the number of pixels smaller than the reference value is configured to increase at least one of a frequency or a number of pulses of the respective touch driving signal relative to another touch pixel block and to apply the respective touch driving signal having the at least one of the frequency or the number of pulses increased to the touch pixel block having the number of pixels smaller than the reference value.

14. The micro-LED touch display device of claim 13, wherein each of the analog front-end circuits is disposed in each of the plurality of touch pixel blocks and is disposed in a center area of each touch pixel block.

15. The micro-LED touch display device of claim 13, wherein at least one of the analog front-end circuits is configured to:
    modify at least one of a frequency or a number of pulses of a touch driving signal; and
    apply the touch driving signal having the at least one of the frequency or the number of pulses modified to the cathode electrodes of corresponding one of the plurality of touch pixel blocks.

16. The micro-LED touch display device of claim 13, wherein when an object touches the display panel, an object capacitor is generated between the object and the cathode electrode, and the analog front-end circuit is configured to sense change in capacitance of the object capacitor.

17. The micro-LED touch display device of claim 13, wherein the analog front-end circuit is configured to convert a touch signal corresponding to the change in the capacitance into a sensing voltage, and provide the sensing voltage to an analog-to-digital converter circuit external thereto.

* * * * *